United States Patent [19]

Scritchfield

[11] 3,901,619
[45] Aug. 26, 1975

[54] METHOD AND APPARATUS FOR ALIGNING AND MACHINING SURFACES IN CYLINDER HEADS

[76] Inventor: Vernon A. Scritchfield, 4211 Front St., San Diego, Calif. 92103

[22] Filed: Sept. 20, 1974

[21] Appl. No.: 507,942

[52] U.S. Cl. .................. 408/1; 408/75; 408/80; 408/709; 33/185 R
[51] Int. Cl.² ................. B23B 35/00; B23B 49/00
[58] Field of Search .......... 408/1, 75, 82, 99, 709, 408/72 R, 72 B, 81, 80, 91, 116, 186; 33/181 AT, 181 R, 185 R; 90/11 E

[56] References Cited
UNITED STATES PATENTS 3,625,624  12/1971  Fitzsimmons ................. 408/116
3,728,940  4/1973   Peterson ..................... 33/185 R X
3,836,277  9/1974   Brooks ....................... 33/185 R X

*Primary Examiner*—Gil Weidenfeld
*Attorney, Agent, or Firm*—Brown & Martin

[57] ABSTRACT

Centering a cylindrical shaped tool holder in the cylinder opening of a cylinder head of a Volkswagen engine or the like, by positioning a fitted ring into the cylinder, positioning the cylindrical tool holder in a concentric, centered and close fitting hole in the ring, securing the cylinder head relative to a drill mechanism in which the cylindrical tool is held, and removing the ring and inserting a radially outward and downward projecting cutter and tip for machining the bottom surface of the cylinder bore and removing a circular burr.

7 Claims, 9 Drawing Figures

PATENTED AUG 26 1975 3,901,619

SHEET 1 OF 2

METHOD AND APPARATUS FOR ALIGNING AND MACHINING SURFACES IN CYLINDER HEADS

BACKGROUND OF THE INVENTION

In the known Volkswagen air cooled engines, the cylinder head has a cylinder and bore for receiving a sleeve. The cylinder head is drawn toward the cylinder block compressing the sleeve therebetween. However, in normal operation of this Volkswagen engine, the sleeve tends to work and in so doing, creates a circular burr in the cylinder bore that eventually has to be removed. This burr is removed by machining.

Machining the circular burr from the cylinder head requires precise alignment so that the burr is removed without damaging the inner wall surface of the cylinder bore and also to not contact the valve openings in the cylinder head. Further since the burr is circularly oriented and closely spaced to the outer cylinder wall, it is necessary that the cutting member be precisely aligned with the center axis of the cylinder bore. This setting up and machining operation can be rather expensive and difficult to accomplish because of the precise alignment and cutting that is required.

It is therefore advantageous to have an apparatus and method for quickly and precisely aligning the cutting tool with the cylinder surfaces of the cylinder head, by inexpensive, easy-to-use and yet precise tooling.

SUMMARY OF THE INVENTION

In an exemplary embodiment of this invention, a cylindrical shaped tool holder has one end with a means for fixing the tool holder in a drill mechanism or drill press that rotates the tool holder in precise circular and rotational alignment. The tool holder and spindle are moved vertically in the drill mechanism. Positioned under the drill mechanism and normal thereto is a drill plate or carriage plate. The drill plate normally has support means for moving heavy objects such as cylinder heads over the drill plate surface, such as by air bearings or the like. These support mechanisms are locked in position when desired to hold whatever is secured to the support members in the precise and set alignment with the drill mechanism, and in this instance the cylindrical tool holder held therein.

To align the tool holder with the cylindrical bore of the cylinder head, a ring having an outer surface that snugly fits into the cylindrical bore, is positioned in the cylinder bore. The ring has an inner circular opening that is concentric with and aligned with its longitudinal axis or center, and has a diameter that provides a snug fit with the outer surface of the cylindrical tool holder. Thus when the ring is placed in position in the cylinder bore, and the cylindrical tool holder is placed in the centered opening of the circular ring, then the tool holder is aligned with the center axis of the cylinder bore.

When this is accomplished, then the cylinder head is locked to the support means and the support means is then locked to the drill plate. The drill mechanism then raises the circular tool holder upwardly allowing the circular ring to be removed. A cutting tool is then inserted into a radially projecting opening in the tool holder and is radially aligned with a tool tip positioned radially outward from the outer cylindrical surface of the tool holder and with the cutting tip projecting downwardly below the lower surface of the tool holder. The tool holder, cutting tool and tip are then rotated as necessary to cut the circular burr from the bottom surface of the cylinder bore, and then the cylindrical tool holder is moved upwardly completing the job. The depth of the cut may be set by setting the spindle stop on the drill mechanism.

It is thus an object of this invention to provide a new and improved method and apparatus for machining the circular burr that occurs in the cylinder bore of cylinder heads for Volkswagen air cooled engines in a simplified, quick and inexpensive manner only requiring easily made and inexpensive tooling.

Other objects and many advantages of this invention will become more apparent upon a reading of the following detailed description and an examination of the drawing, wherein like reference numerals designate like parts throughout and in which.

Figure 1:
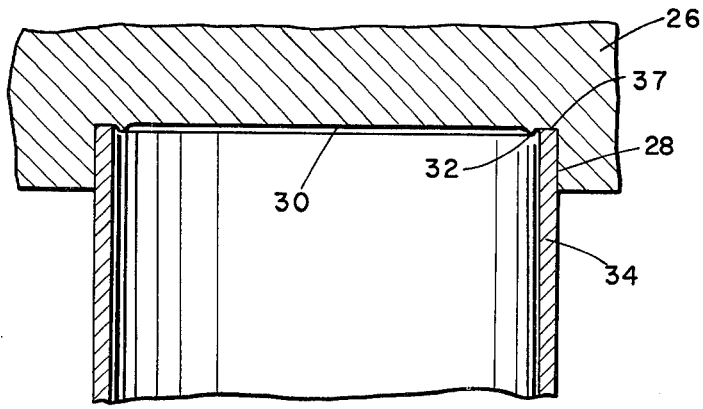
FIG. 1 is a sectional view of a typical cylinder head and sleeve, showing the formed circular burr that is required to be removed by the mechanism and method.
Figure 2:
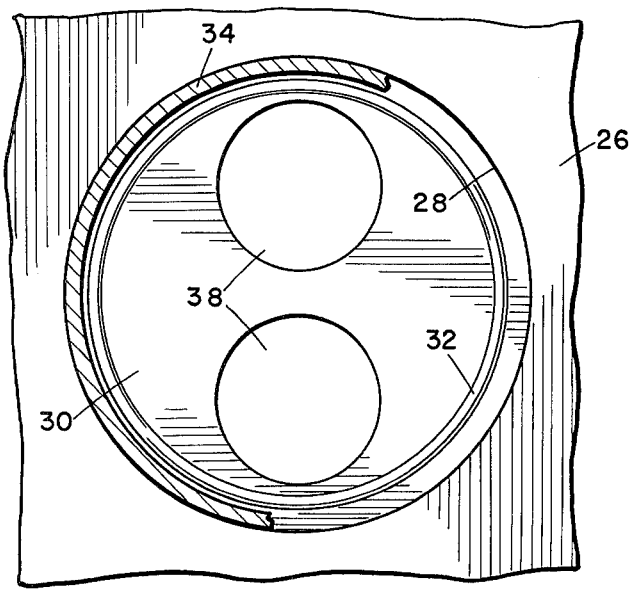
FIG. 2 is a view from below FIG. 1, with part of the sleeve cut away.
Figure 3:
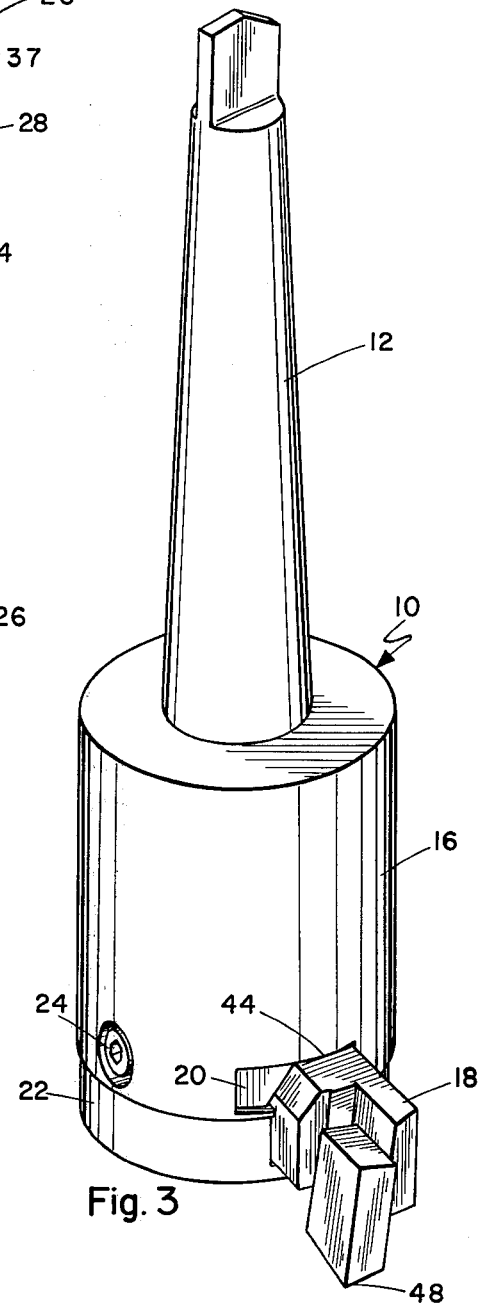
FIG. 3 is a perspective view of the burr removing tool.
Figure 5:
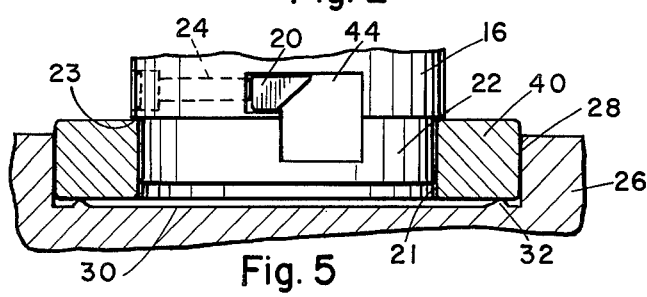
FIG. 5 illustrates the initial alignment of the tool in the alignment ring positioned in the cylinder bore.
Figure 6:
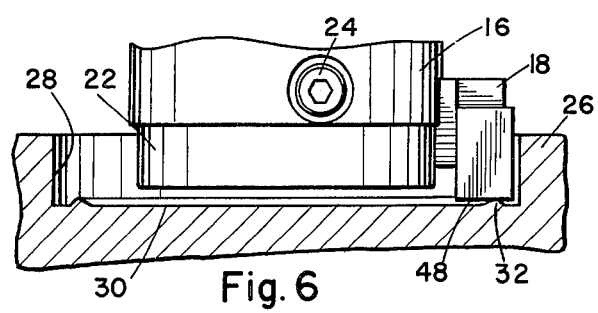
FIG. 6 illustrates the tool cutting away the circular burr.
Figure 4:
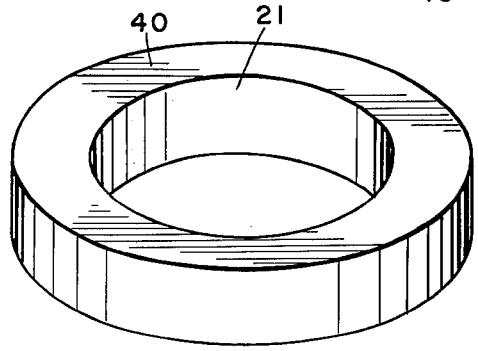
FIG. 4 is a perspective view of the centering ring used to align the tool.

Referring now to the drawings and particularly FIGS. 1 through 6, the cylinder head for a Volkswagen air cooled engine comprises an aluminium head 26 that has a cylinder bore 28 that receives a cylinder sleeve 34. The cylinder sleeve 34 is positioned between the cylinder head 26 and the cylinder block, not shown. In normal use of the engine, the cylinder sleeve 34 tends to work relative to the cylinder head 26 in the cylinder bore 28. Thus the end 37 in this abutting working relationship, creates a circular burr 32 in the end surface of the cylinder opening or bore 30. It then becomes necessary to remove the burr 32 by a cutting operating, and yet not damage the side surfaces 28 of the cylinder opening, and not contact the exhaust and intake ports 38.

In accomplishing this, a cutter or cutter tool holder 10 is employed that has a cylindrical base portion 16 with a reduced in diameter cylindrical end portion 22. The tool holder 10 has a tapered end 12, such as a Number 2 or Number 3 Morse taper for fitting into the drill holder of a drilling machine, or it can have a straight end, not shown. A cutting tool 18 has an elongated base member that projects into a radially directed opening 44, where it is held in position by member 20 that is moved to a locking position against the cutter 18 by a screw mechanism 24. The cutter 18 has a cutter tip 48 that extends radially outward from the outer cylindrical surface of the cylindrical ends 16 and 22 and the cutter tip 48 extends below the lower surface of the tool holder 10.

In aligning the tool holder 10 in the cylindrical bore of the cylinder head, a ring 40 that may be made of any suitable hard material, is fitted into the cylindrical bore 28. The outer circular surface of ring 40 has a diameter that makes it fit snugly in the cylinder bore 28. The ring 40 has an inner concentric and centered circular hole 21 that snugly fits around the cylindrical end 22 of the tool holder 10. The shoulder between the reduced diameter end 22 and the cylindrical surface 16, forms an abutting shoulder for resting against the upper surface of the ring 40.

Thus when the ring 40 is placed in the cylinder opening 28 and the tool holder 10 is placed in the inner circular opening 21, then the tool holder and its tapered end 12 are aligned along the central axis of the cylinder bore.

Since at this time the tool holder has already been placed in a drill press or the like and is moved up and down on the spindle of the drill mechanism, and since at this point in time the cylinder opening in the cylinder head 26 is aligned with the tool member 16 through the use of ring 40, then the spindle of the drill mechanism is raised pulling the tool holder 10 upwardly and the end 22 out of opening 21. Ring 40 is then removed from the cylinder bore 30 and the cutter head 18 is inserted into position with the cutter tip 48 positioned at the diameter indicated in FIGS. 5 and 6. The set screw 24 is then turned locking the cutter 18 in position and the spindle is then rotated turning the cutting tool 18 at the same time advancing the spindle downwardly removing the circular burr 32.

Figure 7:
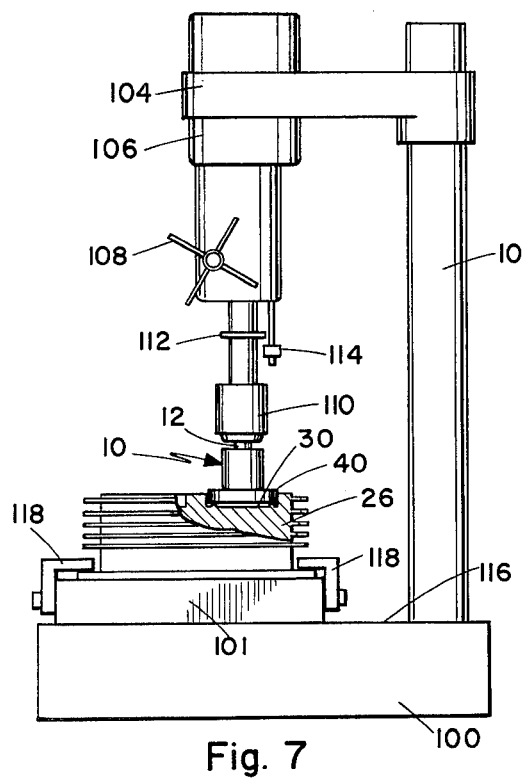
FIGS. 7 through 9 illustrate the steps of carrying out the method on a typical drilling machine.
Figure 8:
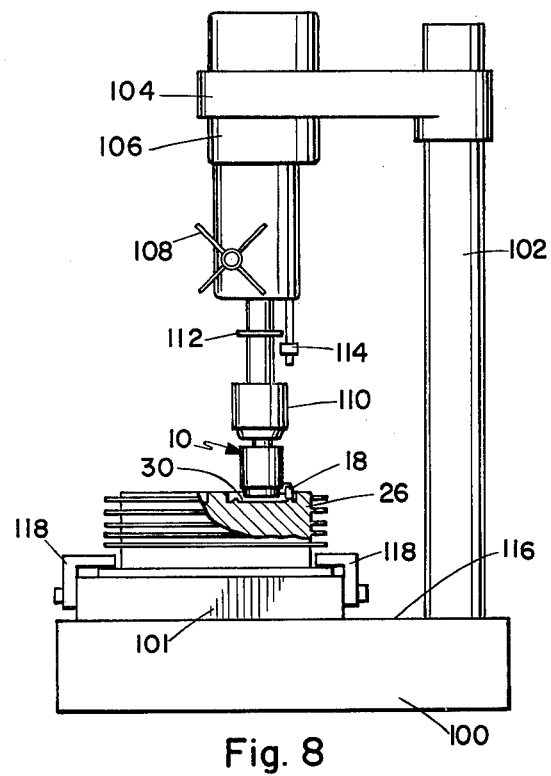
Figure 9:
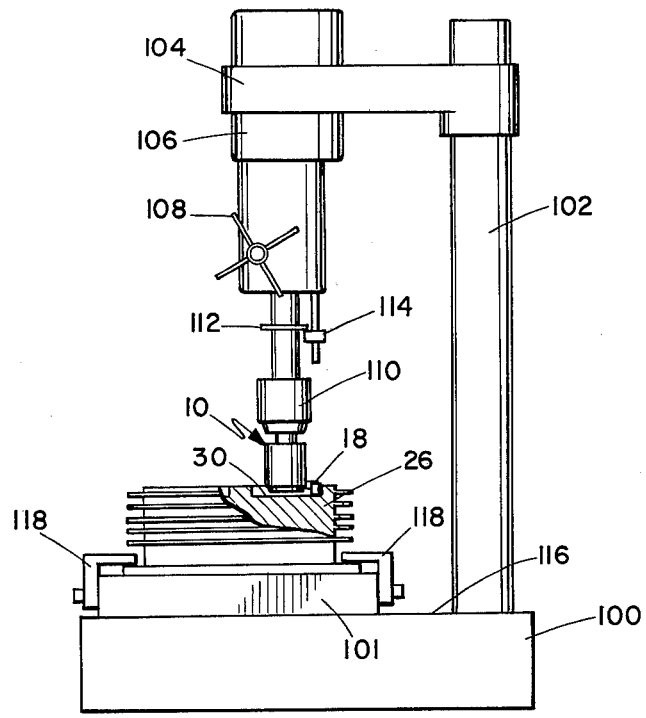

In the method of operation, referring to FIGS. 7, 8 and 9, a drill mechanism 106 is supported by an arm support 104 in column 102 on a drill plate 100. Positioned on the upper surface 116 of the drill plate 100 is a movable support means 101 that may be moved by an air bearing or similar mechanism, such machines being well known. One or more of the cylinder heads 26 are secured by clamps 118 or the like to the movable supports 101. The tool holder 10 is positioned in the chuck 110 of the drill spindle. The cutting tool 18 at this point in time is not mounted into the tool holder 10. The ring 40 is then placed in the cylinder bore and the end 22 of the tool holder is lowered into opening 21 by moving the cylinder head. This aligns the cylinder bore 30, cylinder head 26, and support plate 101 on the drill plate 116 with the tool holder 10 in ring 40 in the cylinder bore. When this alignment is accomplished, then support plate 101 is fixedly secured to the carriage plate or drill plate surface 116 and the drill spindle is then raised, pulling the tool holder from the ring opening 21 of the ring 40. Ring 40 is then removed from the cylinder bore and the cutting tool is inserted in position at the correct radial alignment. The depth of the cut is then set on a spindle depth stop mechanism 112 and 114, and the cutting tool is then operating and vertically controlled by feed mechanism 108 until the correct depth of cut has been accomplished.

The tool is then moved to the next cylinder bore and the method is repeated in the manner described.

If, when the cut is made to the limit of the depth stop, the burr in the second cylinder bore is not completely removed, the depth stop is released and the cut is continued until the burr is gone. The depth stop is then reset to the depth of the new cut. If the additional cut required is more than 0.005 inch, the first bore must be additionally cut to match the cylinders within that limit for proper operation of the engine. This is accomplished by repositioning the first cylinder bore under the tool and repeating the basic steps of FIGS. 7 through 9.

It may thus be seen, that the operation provides a quick, easy and fast alignment of the cutting tool holder, drill spindle and cutting tool for removing the circular burr from the Volkswagen cylinder heads.

Having described my invention, I now claim:

1. Apparatus for machining cylinder surfaces in cylinder heads for Volkswagen engines and other similar cylinder heads comprising, a cylindrical tool holder having one end for being coaxially supported in a rotatable spindle of a drill mechanism, said mechanism can be secured in a fixed position relative to a cylinder bore in the cylinder head, a circular ring having a predetermined outer circular edge surface sized for insertion into the cylinder bore with a close fit and having a predetermined inner concentric and centered circular surface forming a hole and sized for receiving the cylindrical tool holder with a close fit, said tool holder supported in said spindle being received in said circular ring supported in the cylinder bore, whereby the tool holder axis is aligned with the axis of the cylinder bore, and said tool holder having means upon being removed from said circular ring for holding a removable cutting tool with a cutter tip, said tool projects radially outward from the cylindrical surface of the tool holder and said cutter tip has a cutting edge that projects below the bottom surface of the tool holder to machine the bottom of the cylinder bore.

2. An apparatus as claimed in claim 1 wherein, said cylindrical tool holder has a lower cylindrical end with a diameter less than the upper cylindrical end, the abutment of the two surfaces forming a circular shoulder, and said lower cylindrical end fitting in said hole of said ring with said circular shoulder resting on said circular ring.

3. An apparatus as claimed in claim 1 wherein, said drill mechanism having means for raising the cylindrical tool holder relative to said cylinder bore, whereby said circular ring can be removed and then said cylindrical tool holder can be inserted with said cutting tool into said centered cylinder bore.

4. An apparatus as claimed in claim 3 including, means for allowing said cylinder head and cylinder bore to move relative to said drill mechanism and said cylindrical tool holder, and means for locking in position said cylinder head relative to said cylindrical tool holder as mounted in said drill mechanism.

5. The method of machining cylindrical surfaces in cylindrical heads for Volkswagen engines and other similar cylinder heads comprising the steps of, positioning a cylindrical tool holder in a drill mechanism, positioning a cylinder head with a given cylinder bore generally aligned with the cylindrical tool holder, placing a circular ring in the cylinder bore, which ring has an outer circular edge surface that provides a close fit with the inner cylindrical surface of the cylinder bore, positioning said cylindrical tool holder in a centered hole in the circular ring which centered hole is concentric and centered and has an inner circular surface for receiving with a close fit the cylindrical tool holder, securing said cylinder head in a fixed and held position relative to said drill mechanism as aligned by said cylindrical tool holder and circular ring,
raising said cylindrical tool holder vertically and removing said ring from the cylinder bore,
inserting a cutting tool into said cylindrical tool holder which cutting tool radially projects outwardly from the outer cylindrical surface of the tool holder and which cutting tool has a cutter tip with a cutting edge that projects below the bottom surface of said tool holder,
moving said cutting tool and tip in said tool holder to the desired radial position,
fixing said cutting tool in said tool holder,
and rotating said tool holder and cutting tool and machining the bottom of said cylinder bore.

6. The method as claimed in claim 5 wherein said method is used for cutting a circular burr from the bottom surface of the cylinder bore including the steps of,
setting a spindle stop mechanism on said drill, for setting the depth of cut to be made by the cutter tip,
and operating said drill until the drilling operation is ceased by the spindle stop.

7. The method as claimed in claim 5, and including the further steps of,
repeating the entire basic sequence of steps in a subsequent cylinder bore in the same cylinder head and, if the removal of the burr requires a cut deeper by a predetermined amount beyond that set on the spindle stop mechanism, then resetting the spindle stop mechanism to the depth required for burr removal,
then repeating the basic sequence of steps in the first cylinder bore to match the depth of cut in the bores within predetermined limits.

* * * * *